United States Patent [19]

Yunick

[11] 4,135,730
[45] Jan. 23, 1979

[54] RACING TYPE SULKY

[76] Inventor: Smokey A. Yunick, 1731 Cordova Ave., Holly Hill, Fla. 32017

[21] Appl. No.: 764,872

[22] Filed: Feb. 2, 1977

[51] Int. Cl.² .......................................... B62D 27/04
[52] U.S. Cl. .................................................. 280/65
[58] Field of Search ............... 280/63, 64, 65–77; 267/20 A, 34, 61 S, 64 B, 89; 301/133, 136

[56] References Cited

U.S. PATENT DOCUMENTS

| 457,912 | 8/1891 | Ferris | 280/74 |
|---|---|---|---|
| 508,336 | 11/1893 | Payne | 280/65 |
| 577,339 | 2/1897 | Wells | 280/63 |
| 762,038 | 6/1904 | Frazier | 280/63 |
| 1,340,414 | 5/1920 | Schneider | 301/133 |
| 3,388,921 | 6/1968 | Pickard | 280/63 |
| 3,482,851 | 12/1969 | Pickard | 280/63 |
| 3,912,292 | 10/1975 | Lichfield | 280/63 |
| 4,033,598 | 7/1977 | King | 280/63 |

*Primary Examiner*—Joseph F. Peters, Jr.
*Assistant Examiner*—Kramar L. Stack, Jr.
*Attorney, Agent, or Firm*—John N. Randolph

[57] ABSTRACT

A racing type sulky having a frame constructed of rigid tubular material and equipped with springs and shock absorbers between the frame and wheels.

4 Claims, 6 Drawing Figures

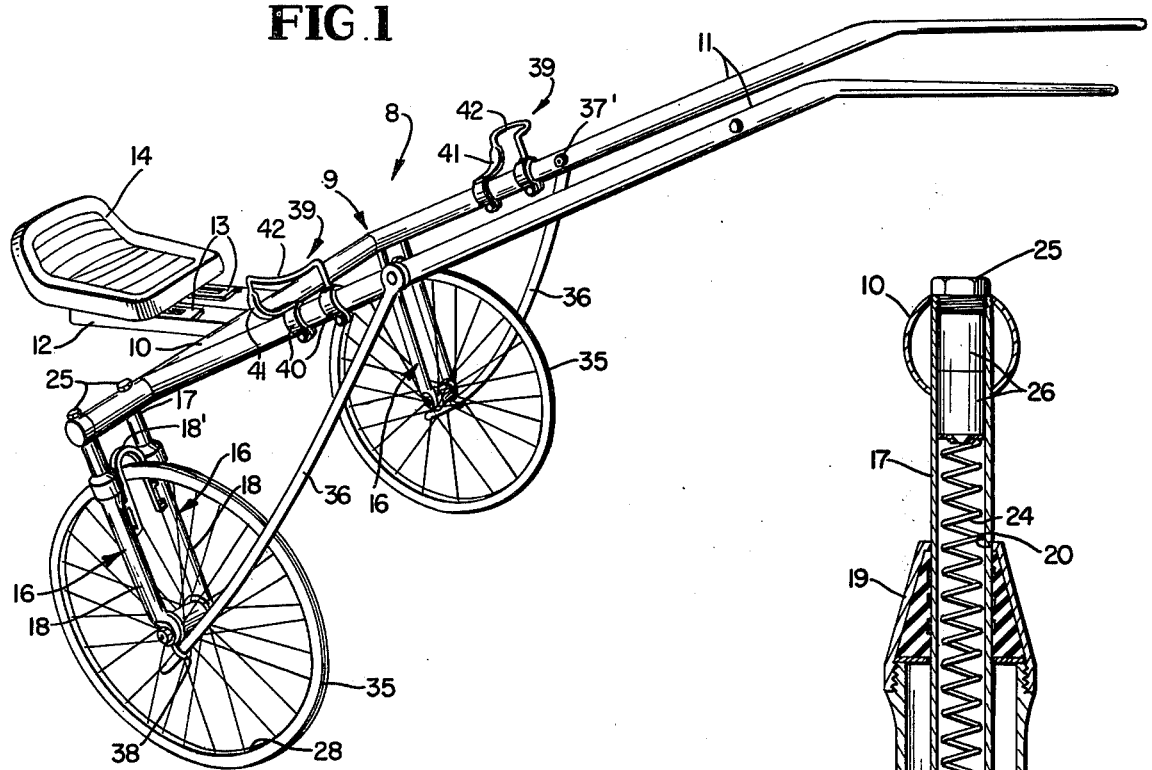
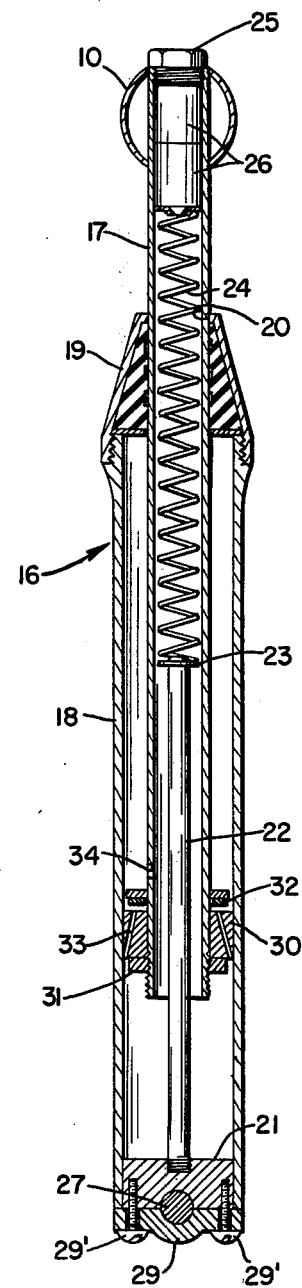
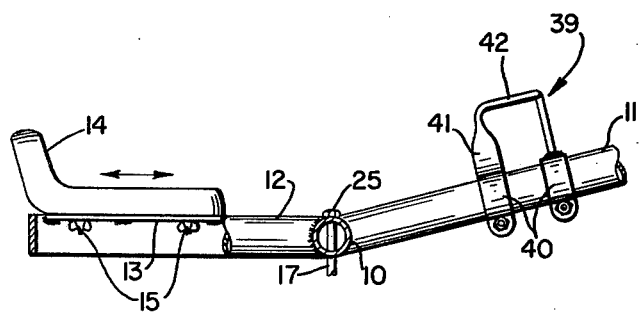

RACING TYPE SULKY

SUMMARY

It is a primary object of the present invention to provide a light weight racing type sulky which is extremely strong and durable and which is equipped with springs and shock absorbers for cushioning the impact forces which would otherwise be imparted to the frame due to contact of the wheels with irregular surfaces.

Another object of the invention is to provide a sulky frame on which the seat is rigidly supported and which is adjustable relative to the frame and to footrests supported on the thills.

Still a further object of the invention is to provide a sulky having footrests which may be adjustably positioned on the thills and relative to the seat, and which are constructed to afford maximum comfort to the feet of the driver.

Various other objects and advantages of the invention will hereinafter become more fully apparent from the following description of the drawings, illustrating presently preferred embodiments thereof, and wherein:

BRIEF DESCRIPTION OF THE DRAWINGS

FIG. 1 is a perspective view illustrating one embodiment of the racing type sulky;

FIG. 2 is an enlarged central sectional view partly in elevation of one of the fork arms with built-in spring and shock absorber;

FIG. 3 is a fragmentary sectional view of a portion of the sulky;

DESCRIPTION OF THE PREFERRED EMBODIMENTS

Figure 4:
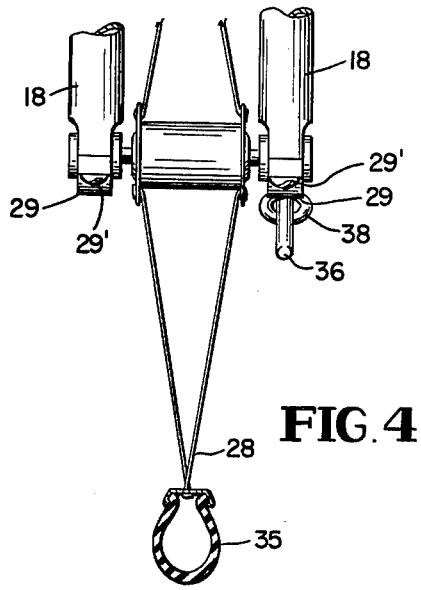
FIG. 4 is a fragmentary view of a portion of one of the wheel forks and the wheel mounted therein.

Referring more specifically to the drawings, and first with reference to FIGS. 1 to 4, the racing type sulky as illustrated therein is designated generally 8 and includes a rigid tubular frame 9, preferably formed of steel. The frame 9 includes a rear cross member 10 and a pair of thills 11 which are fixed to and extend forwardly from transversely spaced portions of the cross member 10. A rigid seat support 12 is secured to and extends rearwardly from an intermediate portion of the cross member 10 and includes slotted plates 13. A seat 14 is mounted on the supports 12 and is adjustably secured thereto by bolt and nut fastenings 15 which engage through the slots of the plates 13 for securing the seat 14 spaced different distances behind the cross member 10.

A pair of fork members 16 is connected to and extend downwardly from each end of the cross member 10. The fork members of each pair includes an inner sleeve or tube 17, FIG. 2, having an upper portion extending nearly vertically through and secured in the cross member 10 and a lower portion which is disposed in a larger tube or cylinder 18. A sealing cap 19 is threadedly connected to the upper end of the tube 18 and has a central bore 20 to slidably receive and guide the tube 17. The lower end of the tube 18 is closed by a block 21. A rod 22 is connected at its lower end to the block 21 and extends upwardly therefrom into the tube 17 and terminates at its upper end in an enlarged head 23, which provides a seat for the lower end of a compression spring 24 which is disposed in the upper portion of the tube 17. The upper end of the tube 17 is closed by a threaded plug 25. One or more tension spacers 26 are interposed between the upper end of the spring 24 and the plug 25 for varying the tension on the spring 24. Parts 17 to 26 combine to form a spring suspension. An end of the axle 27 of one of the sulky wheels 28 is clamped between the block 21 and an axle clamp 29 which is secured to the underside of the block 21 by screw fastenings 29'.

Tubes 17 and 18 are substantially filled with a hydraulic fluid, not shown. A piston 30 is mounted on the lower portion of the inner tube 17 and has close fitting engagement with the outer tube 18. A collar or ring 31 engages around the lower end of the tube 17 below the piston 30, and a check valve 32 is secured around tube tube 17, above and normally spaced from the piston 30. The piston 30 has passages 33 extending therethrough from its upper side to its underside, and the tube 17 has at least one port 34, located above the check valve 32, providing communication between the tubes 17 and 18, above the piston 30.

It will thus be seen that when the wheels 28, which are equipped with pneumatic tires 35, strike an uneven surface, said wheels can move upwardly, relative to the frame 9, for cushioning the resulting impact forces. As this occurs, the tubes 18 will move upwardly relative to the tubes 17 against the resistance of the springs 24. During this initial movement, fluid will pass from the lower portions of the tube 18 into the upper portions thereof, through the passages 32 and 34 into the space between tubes 17 and tubes 18. When wheel 28 returns to its original location or moves to a lower position in relation to frame 9, as would be the case when wheel 28 drops into a depression, the space in tube 18 below piston 30 rapidly increases causing hydraulic fluid to pass through port 34 only, since check valve 32 has closed passages 33. This action acts to dampen the motion and makes for a smoother ride. The tubes 18 of each pair of fork members 16 are connected by an arch-shaped brace 18' which extends over the tire 35 and has its depending ends secured to the tubes 18, thus making each pair of fork members a single rigid unit.

Bumper rods or "nerf bars" 36 have upper ends pivotally connected at 37' to outer sides of the thills 11. The bars 36 extend downwardly and rearwardly on the outer sides of the wheels 28 and have rear portions slidably engaging in guide rings 38, located on the lower ends of tubes 18. The sliding connection of bars 36 to rings 38 not only allows up and down movement of the fork members 16 relative to the bars 36, but also permits spreading of the thills 11 to accommodate horses of different sizes.

A footrest 39 is mounted on each thill 11 and has terminals defined by clamps 40 which are secured to the thills and by which the position of the footrests and their distances from the seat 14 can be varied to best suit a particular driver. Each footrest 39 has a wide flattened rear portion 41 against which the heel portion of the driver's boot, not shown, can rest flush when the instep of the shoe is bearing against the footrest portion 42.

Figure 6:
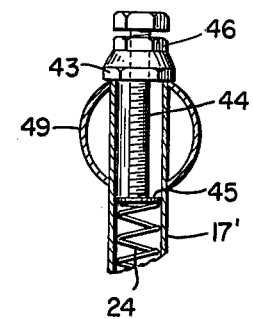
FIG. 6 is a fragmentary view, similar to the upper portion of FIG. 2, illustrating a modification thereof.

FIG. 6 illustrates a slightly modified embodiment of the fork member 16 and wherein a tube 17' replaces the tube 17 and has a cap 43 connected to its upper end in place of the plug 25. A screw 44 extends threadedly through the cap 43 and has a head 45 at its lower end against which the upper end of the spring 24 bears. The screw 44, which replaces the spacer 26, can be adjusted in the cap 43 for varying the tension on the spring 24. A lock nut 46 is mounted on the screw 44 and bears against the upper side of the cap 43 for retaining said screw in different adjusted positions.

Figure 5:
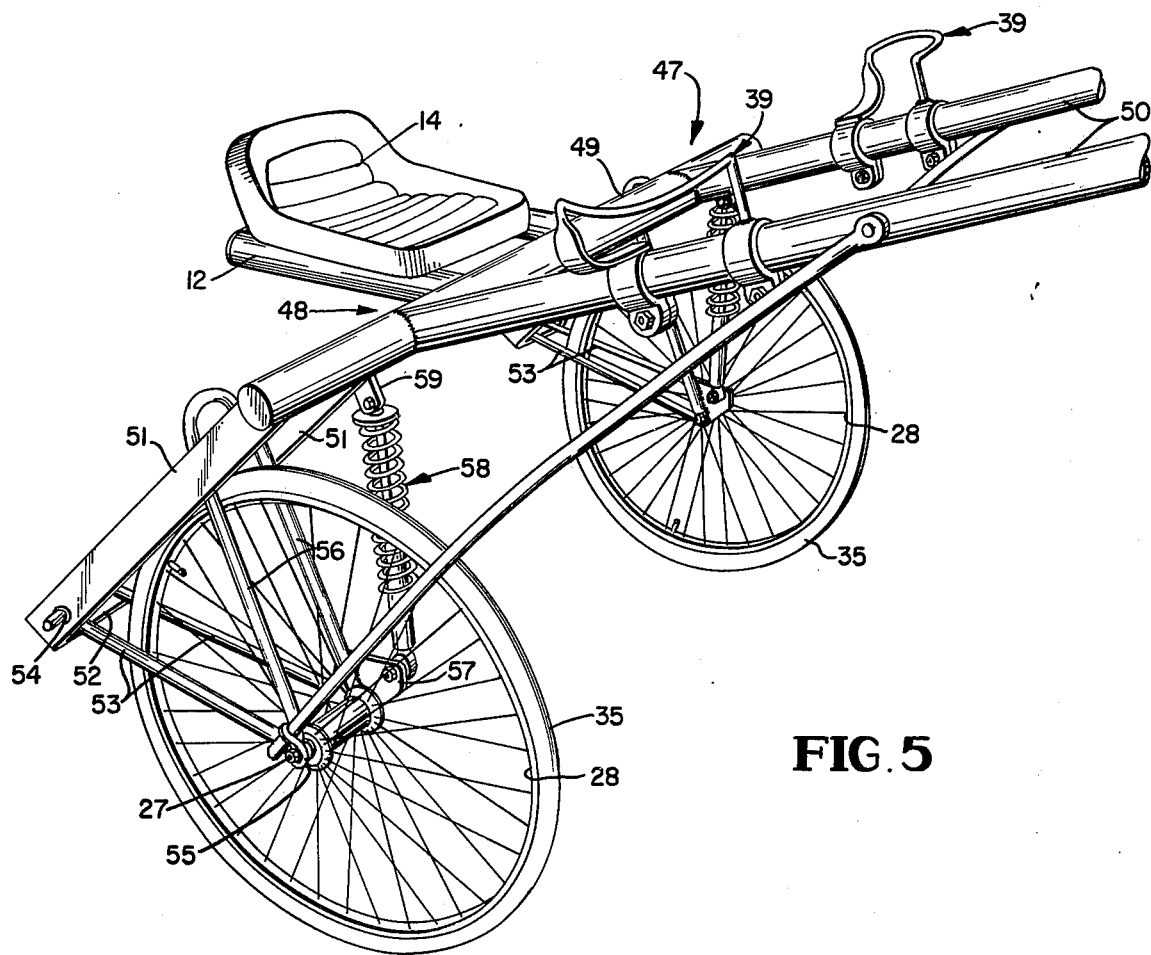
FIG. 5 is a fragmentary perspective view of another embodiment of the sulky.

FIG. 5 illustrates a slightly modified embodiment of the sulky, designated generally 47, including a tubular frame 48 having a rear cross member 49 and thills 50. Fork members 51 extend downwardly at an incline from each end portion of the cross member 49 and may be connected at their lower ends by cross pieces 52. A fork arm 53 is pivotally connected at 54 at one end thereof to each fork member 51. The other end 55 of each fork arm 53 is disposed beneath the cross member 49 to receive an end of the wheel axle 27. Guide bars 56 extend upwardly from each of the fork arm ends 55. Upper portions of the guide bars 56 of each pair of fork arms 53 slidably engage against inner surfaces of the fork members 51 to which said fork arms 53 are connected.

An ear 57 projects from a lower portion of one guide bar 56 of each pair of fork arms and is pivotally connected to the lower end of a shock absorber and spring assembly 58, the upper end of which is pivotally connected to an ear 59 which extends downwardly from the cross member 49. The assembly 58 may be of any desired construction and may correspond with the fork member 16. It will also be apparent that a shock absorber 58 can be attached to each guide bar of each pair of fork arms.

From the foregoing, it will be readily apparent that when the wheels 28 of the sulky 47 are deflected upwardly by passing over an uneven surface, that the fork arms 53 will swing upwardly with the wheels 28 toward the cross member 49. The assemblies 58 will cushion this upward swinging movement of the fork arms and wheels and will return the wheels to their normal positions relative to the frame 48 after the wheels have passed over the uneven surface for cushioning the impact on the sulky frame 47 and thus on the occupant of the seat 14. During swinging movement of the wheels and fork arms 53 relative to the frame 48, the guide bars 56 will slidably engage the inner surfaces of the fork members 51 to prevent any twisting of the wheels relative to the frame 48 and for maintaining said wheels in correct parallel relation to one another during their swinging movement. It will be understood that fork members 51 could be extended forwardly instead of rearwardly as shown, in which case all related parts would be reversed but their action would remain the same.

The remainder of the sulky 47 corresponds with the sulky 9, as previously described in detail.

Various other modifications and changes are contemplated and may be resorted to, without departing from the function or scope of the invention.

I claim as my invention:

1. A racing type sulky comprising a rigid tubular frame including a rear cross member and a pair of transversely spaced thills fixed to and extending forwardly from the cross member, a seat, means fixed to and extending from the cross member on which the seat is supported, fork members connected to and extending downwardly from each end of said cross member, a ground engaging wheel disposed beneath each end of the cross member and rotatively connected to and disposed between a pair of said fork members, and spring suspension means contained within each fork member for yieldably supporting the frame on the wheels.

2. A sulky as in claim 1, said spring suspension means including a shock absorber.

3. A sulky as in claim 1, and a brace extending between and rigidly connecting the fork members, disposed beneath each end of the cross member, together.

4. A sulky as in claim 1 with nerf bars having upper ends pivotally connected to the thills and lower ends slidably connected to the fork members located on the outer sides of the wheels.

* * * * *